(12) United States Patent
Tamm et al.

(10) Patent No.: US 7,049,520 B1
(45) Date of Patent: May 23, 2006

(54) CONNECTOR FOR SPLICING CABLES

(75) Inventors: Carl R. Tamm, Trussville, AL (US); Chris A. Andrews, Trussville, AL (US); Robert G. Hay, Pelham, AL (US)

(73) Assignee: Hubbell Incorporated, Orange, CT (US)

( * ) Notice: Subject to any disclaimer, the term of this patent is extended or adjusted under 35 U.S.C. 154(b) by 0 days.

(21) Appl. No.: 11/081,779

(22) Filed: Mar. 15, 2005

(51) Int. Cl.
*H02G 3/06* (2006.01)

(52) U.S. Cl. .................. 174/84 C; 174/88 R
(58) Field of Classification Search .............. 174/84 C, 174/88 R; 439/783; 403/314
See application file for complete search history.

(56) References Cited

U.S. PATENT DOCUMENTS

| 492,811 | A | | 3/1893 | Kisinger |
|---|---|---|---|---|
| 772,798 | A | | 10/1904 | Giltner |
| 1,251,103 | A | | 12/1917 | Rasck |
| 1,630,880 | A | | 5/1927 | Yates |
| 1,656,226 | A | | 1/1928 | Palm et al. |
| 1,796,738 | A | | 3/1931 | Wagner |
| 2,068,368 | A | * | 1/1937 | Bouvier et al. ............. 403/314 |
| 2,220,203 | A | | 11/1940 | Branin |
| 2,849,772 | A | | 9/1958 | Buzowski |
| 2,983,012 | A | | 5/1961 | Madden |
| 3,384,704 | A | | 5/1968 | Vockroth |
| 4,451,104 | A | | 5/1984 | Hodgson et al. |
| 4,634,205 | A | | 1/1987 | Gemra |
| 5,147,145 | A | | 9/1992 | Facey et al. |
| 5,151,560 | A | * | 9/1992 | Kreinberg et al. ........ 174/94 R |
| 6,193,565 | B1 | | 2/2001 | Herron |
| 6,773,311 | B1 | | 8/2004 | Mello et al. |

\* cited by examiner

*Primary Examiner*—Chau N. Nguyen
(74) *Attorney, Agent, or Firm*—Alfred N. Goodman; Mark S. Bicks

(57) ABSTRACT

A connector includes a housing having a receiving end, a narrow end, and two side walls. Additionally, the housing includes a cable nesting section and a closed end recess longitudinally disposed on one of the side walls. First and second guide flanges are connected to the top edges of the side walls and a clamping body is slidably engaged with the housing. The clamping body includes first and second side members with upper bearing surfaces, a base wall connecting the side members, and a clamping body nesting section. A protrusion extends from the first member, and is slidably engaged within the closed end recess. A cable passageway is formed between the nesting sections. The upper bearing surfaces of the clamping body are slidably engaged with the guide flanges of the housing.

20 Claims, 5 Drawing Sheets

CONNECTOR FOR SPLICING CABLES

FIELD OF THE INVENTION

The present invention relates generally to a connector for attaching the ends of two cables. More specifically, the present invention relates to a connector having a housing and a slidable clamping body. Still, more specifically, the present invention relates to an electrical connector for a mechanical overhead splice connection for splicing overhead power distribution conductors.

BACKGROUND OF THE INVENTION

Common splice devices in use today are complex and expensive. Typically, conventional splice devices use four electrical interfaces to conduct power from one conductor to another. The electrical path passes from one conductor into a first set of jaws, from the first set of jaws into the outer shell or housing, from the outer shell to a second set of jaws, and from the second set of jaws into an opposite conductor.

U.S. Pat. No. 3,384,704 to Vockroth discloses a typical high tensile automatic electrical connector for joining stranded conductors. The electrical connector has an outer ferrule with a pair of tapered gripping jaw means. The gripping jaw means are spatially positioned from the ends of the ferrule. Tubular inserts are used for enclosing the gripping jaw means for gripping conductors. A common failure with automatic splicing connectors is mechanical failure due to improper installation, usually when the installer is unable to determine if the conductor is fully inserted. Therefore, premature failure occurs. If the conductor is not fully inserted, the conductor will not properly engage the full length of the jaws inside the connector.

Difficulties also arise when the pilot cup is engaged in the rear of the jaws, thus preventing engagement of the jaws with the conductor. Therefore, full compression of the jaws onto the conductor is prevented. If undetected during the installation process, improper positioning of the pilot cup may result in an incomplete assembly or catastrophic mechanical failure.

Consequently, a continuing need exists to provide a splicing connector in which an installer can determine if full insertion is achieved.

SUMMARY OF THE INVENTION

An object of the present invention is to provide a connector having a preassembled housing and clamping body, thus avoiding field assembly.

Another object of the present invention is to provide a connector wherein determining full insertion of the splicing connectors is easily ascertainable by an installer, thereby preventing mechanical failure due to improper installation.

A further object of the present invention is to provide a connector that is relatively simple and inexpensive to manufacture and package.

The foregoing objects are basically obtained by a connector housing having a receiving end, a narrow end, first and second side walls, and a housing nesting section. A closed end recess is longitudinally disposed on the first side wall. First and second guide flanges are connected to the top edges of the first and second side walls, respectively. A clamping body is slidably engaged with the housing. The clamping body includes first and second side members having upper bearing surfaces, a base wall connecting the side members, and a clamping body nesting section. At least one protrusion extends laterally from the first member, and is slidably engaged within the closed end recess. A cable passageway is positioned between the nesting sections. The upper bearing surfaces of the clamping body slidably engage the guide flanges of the housing.

The foregoing objects are also attained by a connector having a housing having a receiving end, a narrow end, first and second side walls, and a housing nesting section. A closed end recess is longitudinally disposed on the second side wall. First and second guide flanges are connected to top edges of the first and second side walls, respectively. A clamping body is slidably engaged within the housing. The clamping body includes first and second side members having upper bearing surfaces, a base wall connecting the side members, and a clamping body nesting section. At least one protrusion extends laterally from the second member, and is slidably engaged within the closed end recess. A cable passageway is positioned between the nesting sections. The upper bearing surfaces of the clamping body slidably engage the guide flanges of the housing.

The foregoing objects are further attained by a method comprising the steps of engaging at least one protrusion of a clamping body within a closed end recess longitudinally disposed on one of a first or second side wall of a housing. Then, a first cable is inserted into a receiving end of the housing proximate a housing nesting section. Next, a second cable is inserted into a narrow end of the housing proximate a clamping body nesting section. Thus, both cables are positioned in a cable passageway formed between the nesting sections, respectively. Consequently, the clamping body is advanced towards the housing narrow end and an engagement surface of the clamping body nesting section cams in a direction toward the engagement surface of the housing cable nesting section.

By forming the connector and by performing the method in this manner, an installer may determine if splicing connectors are in the fully inserted position, thereby improving electrical contact between the connectors and preventing mechanical failure.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure.

DETAILED DESCRIPTION OF THE EXEMPLARY EMBODIMENTS

Figure 1:
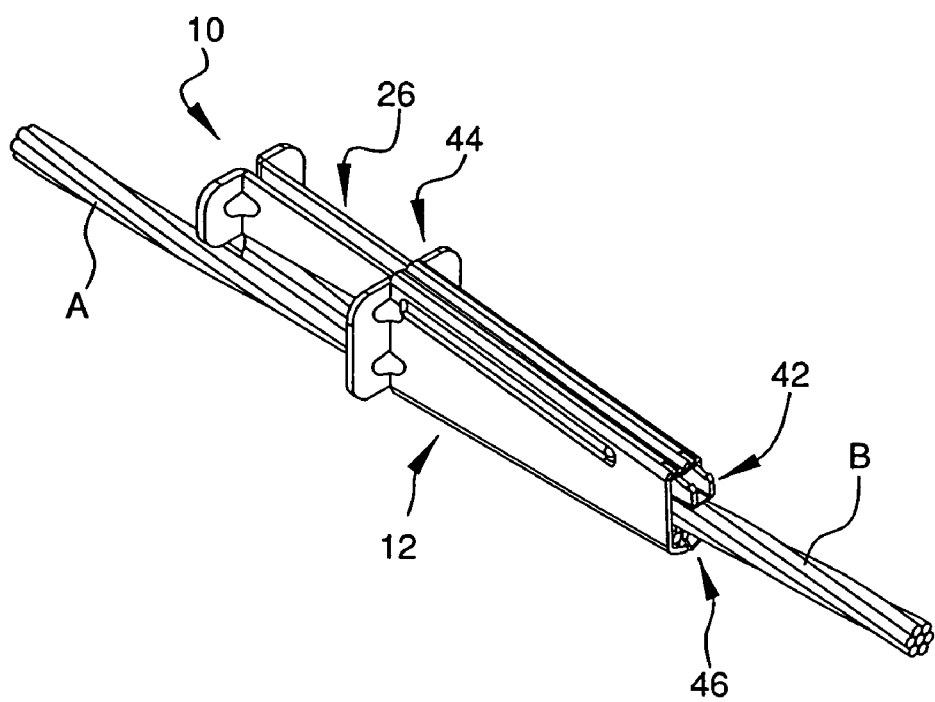
FIG. 1 is a top-front-side perspective view of a connector in accordance with an embodiment of the present invention.

Referring to FIGS. 1–7, a connector 10 includes a housing 12 and a clamping body 26. The housing 12 has first and second side walls 14, 16, a housing nesting section 18, a closed end recess 20, and first and second guide flanges 22a, 22b. Clamping body 26 is slidably engaged within housing 12. The clamping body 26 includes first and second side members 28, 30 having upper bearing surfaces 32, 34, a base wall 36 connecting the side members 28, 30, a clamping body nesting section 38, and a protrusion 40 slidably engaged within the closed end recess 20. A cable passageway 42 is formed between the cable nesting sections 18, 38.

Figure 2:
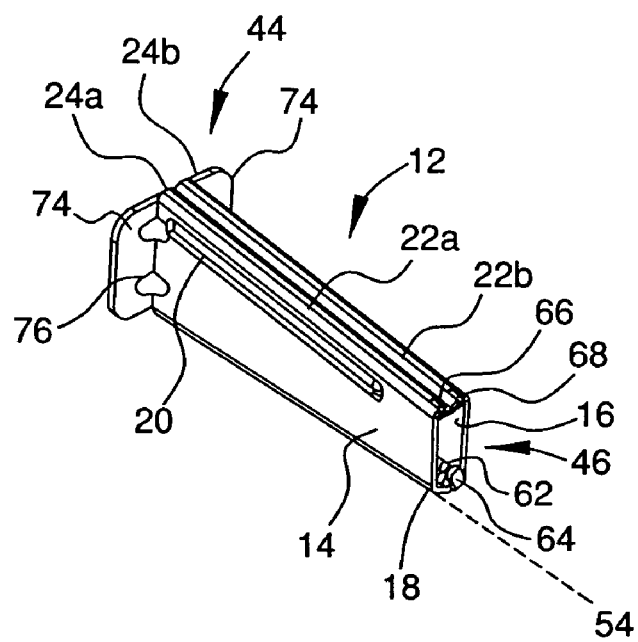
FIG. 2 is a top-front-side perspective view of the housing of FIG. 1.
Figure 4:
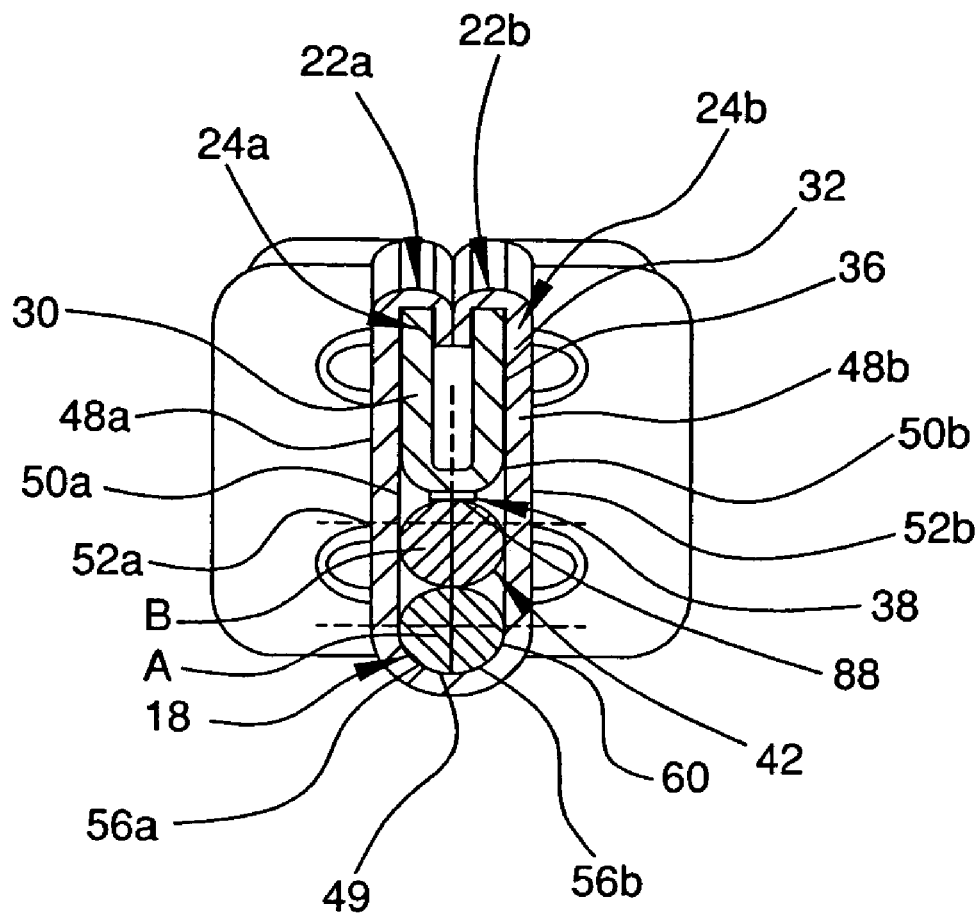
FIG. 4 is an end elevational view in section of the connector of FIG. 1.
Figure 5:
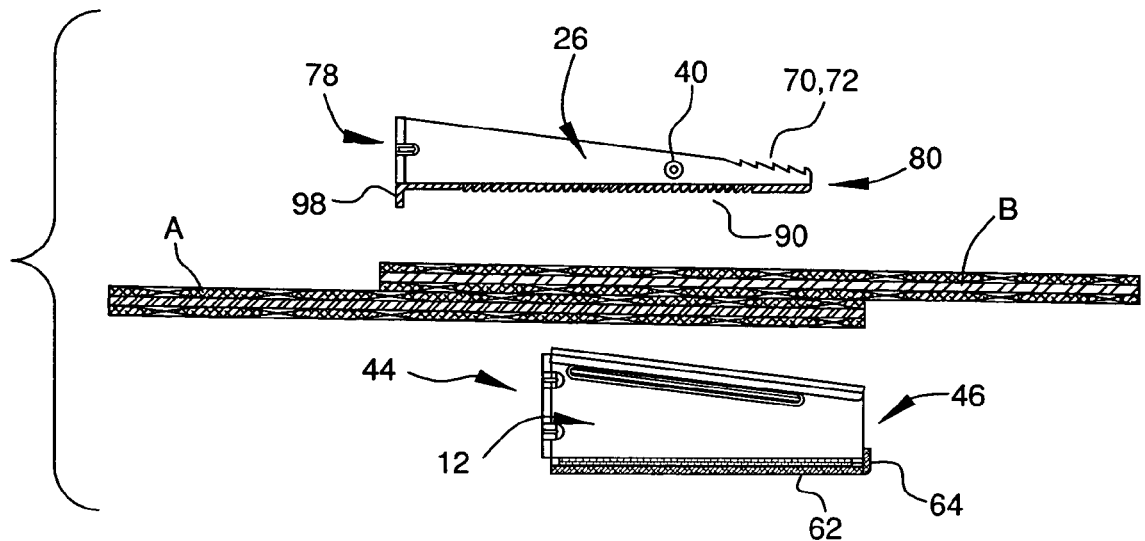
FIG. 5 is an exploded side elevational view in section of the connector of FIG. 1.

As illustrated in FIGS. 1–2, and 4, housing 12 is substantially U-shaped, with a receiving end 44 and a narrow end 46. The receiving end 44 is wider than the narrow end 46. The width of the receiving end 44 facilitates insertion of the clamping body 26 within the housing 12.

As best seen in FIG. 4, first side wall 14 and second side wall 16 are connected by a bottom edge 49. The bottom edge 49 connects side walls 14 and 16 to one another along the longitudinal centerline 54 of the housing 12. Side wall 14 has a top section 48a, inner surface 50a, an outer surface 52a, and a bottom section 56a. Side wall 16 also has a top section 48b, an inner surface 50b, an outer surface 52b, and a bottom section 56b. Each bottom section 56a–b extends outwardly from the longitudinal centerline 54 of the housing 12 at a predetermined angle. Preferably, the angle is about 30°. Each top section 48a–b extends upwardly from a respective bottom section 56a–b in a direction substantially perpendicular to the longitudinal centerline 54 of the housing 12. Each side wall 14, 16 forms a leg of the substantially U-shaped housing 12.

The housing nesting section 18 is disposed between the bottom sections 56a–b and along inner surfaces 50a–b. The longitudinal centerline 54 of the housing 12 divides the housing nesting section 18. Housing cable nesting section 18 is contiguous with the base of the U-shaped housing and has a housing engagement surface 60. The housing engagement surface 60 may be provided with frictional enhancement features 62 (FIG. 2) such as teeth, for increasing the gripping strength of the connector 10.

A cable locating tab 64 (FIG. 2) is positioned along the housing engagement surface 60 to visually assist the installer with insertion of a cable A into the narrow end 46 of the housing 12. Cable locating tab 64 extends upwardly in a direction orthogonal to the longitudinal centerline 54 of the housing 12. Preferably, the cable locating tab 64 is substantially rectangular; however, it may be of any suitable polygonal shape, and has a first planar side and a second planar side.

Attached to the top sections 48a–b of each side wall are guide flanges 22a–22b, respectively. Each guide flange 22a–b is substantially U-shaped and forms a respective U-shaped channel 24a–b for receiving the upper bearing surfaces 32, 34 of the clamping body 26. Each guide flange 22a–b has first, second, and third sections, each with inner and outer surfaces. Each first section extends upwardly and coplanar to the respective top sections 48a–b. Each second section extends inwardly in a direction perpendicular to each guide flange's 22a–b respective first section. Each third section extends downwardly, in a direction parallel to the respective first section and perpendicular to the second section. The third sections of the respective guide flanges 22a–b abut one another along their outer walls.

The guide channels 24a–b have inner surfaces which are angularly oriented relative to the longitudinal axis 54 from receiving end 44 of the housing 12 to the narrow end 46. Therefore, the upper bearing surfaces 32, 34 of the clamping body 26 are guided downwardly at a predetermined angle when moved along the guide channels 24a–b.

Figure 7:
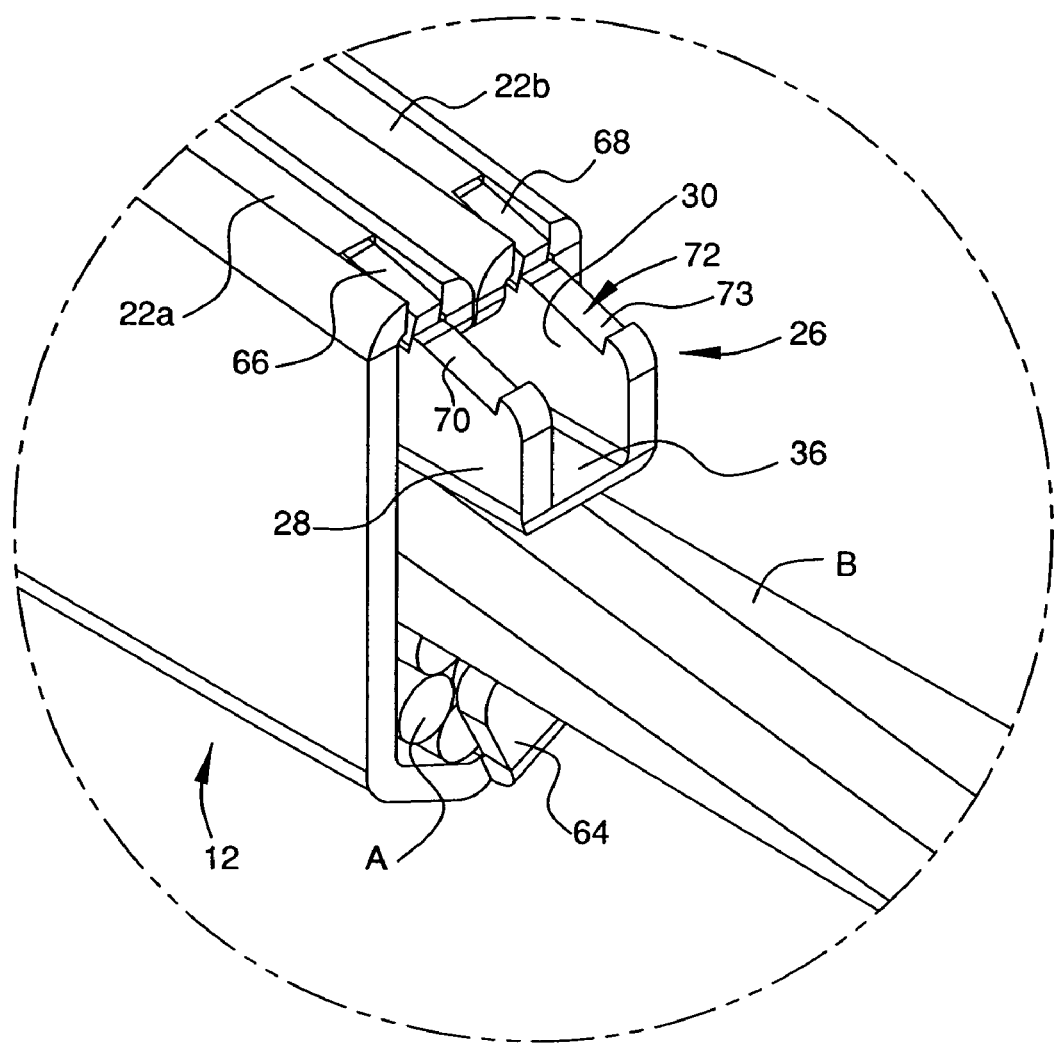
FIG. 7 is an enlarged, partial perspective view of the connector of FIG. 1 in accordance with the present invention, showing the ratchet and pawl system for preventing reversal of the clamping body.

As best seen in FIG. 7, each guide flange 22a–b has an integral, substantially resilient locking tab 66, 68 disposed in their respective guide channels 24a–b proximate the narrow end 46 of the housing 12. The locking tabs 66, 68 are substantially rectangular in shape and are angled downwardly. Corresponding ratcheting serrations 70, 72 on the clamping body 26 mate with these locking tabs. The locking tabs 66, 68 prevent movement of the clamping body 26 in the guide channels 24a–b after insertion of the clamping body 26 past a predetermined point. Consequently, reversal of the clamping body 26 upon engagement with the locking tabs 70, 72 may be prevented.

At least one closed end recess 20 is longitudinally disposed on an inner surface 50a–b of one of the first or second side walls 14, 16. Alternatively, a closed end recess 20 may be placed on both the first and second side walls 14, 16. The closed end recess 20 extends through the predetermined thickness and is visible from the outer surfaces 52a–b by an outward projection. The closed end recess 20 is preferably substantially oblong in shape; however, any suitable polygonal shape may be used. The closed end recess 20 substantially angles with respect to the longitudinal centerline 54 of the housing 12. The closed end recess 20 is disposed proximate the top portion 48 of a respective side wall 14, 16 and preferably closer to the receiving end 44 than to the narrow end 46.

As seen in FIGS. 1–2, a pair of gripping ears 74 extend from the receiving end 44 of the housing 12 in a direction substantially perpendicular to the longitudinal centerline 54 of the housing 12 to facilitate handling of the electrical connector 10 by an installer. The gripping ears 74 are preferably integrally molded to the housing 12; however other suitable conventional means maybe used, such as welding, adhesives, fasteners, molding, casting, or extrusion. The gripping ears 74 are substantially rectangular in shape and have substantially planar top and bottom portions. Edges of the gripping ears 74 may be beveled.

Strengthening ribs 76 may be formed in between each gripping ear 74 and the respective side walls 14, 16 to enhance the rigidity of the device, while providing increased structural support.

The housing 12 may be manufactured by any suitable conventional means such as casting, swaging, molding, forging, or extrusion. Preferably, the housing is made of aluminum; however, any suitable metal or plastic material can be used.

Figure 3:
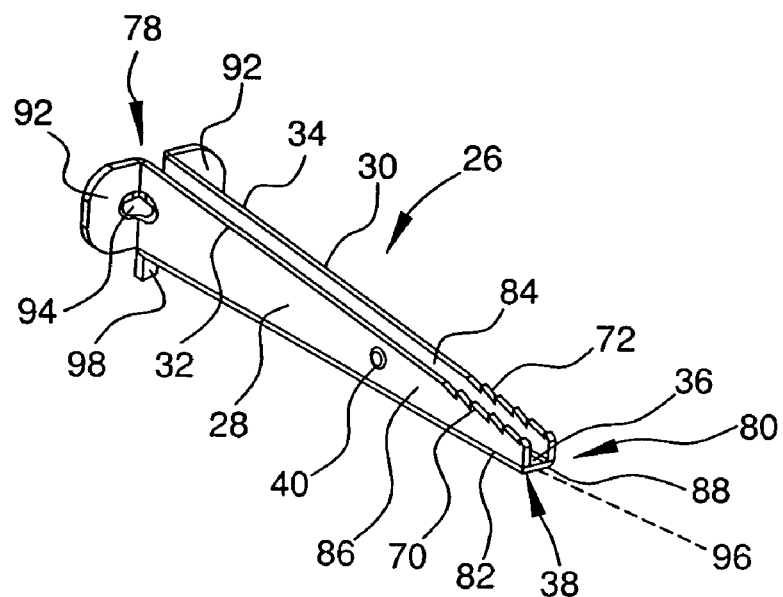
FIG. 3 is a top-front-side perspective view of the clamping body of FIG. 1.

As best seen in FIGS. 1 and 3–4, a clamping body 26 is substantially U-shaped with a first end 78 and a second end 80.

As seen in FIG. 3, base wall 36 extends along a clamping body longitudinal axis 96 and includes a planar top surface and a planar bottom surface 88. The first and second members 28, 30 are connected to the base wall 36 along their bottom edges 82 by conventional manufacturing or fastening means.

The first and second members 28, 30 have an inner surface 84 and an outer surface 86. Each member 28, 30 extends upwardly orthogonal to the longitudinal axis 96 of the clamping body 26. The upper edges of each member form upper bearing surfaces 32, 34. The upper bearing surfaces 32, 34 of each member 28, 30 extend downwardly from the clamping body 26 first end 78 to the second end 80 at a predetermined angle to slidably engage the guide flanges 22a–b. The angel is preferably about 6–7 degrees; however, other suitable arrangement and angles maybe used.

The upper bearing surfaces 32, 34 have the ratcheting serrations 70, 72 proximate the second end 80. Each ratcheting serration 70, 72 is substantially triangular in shape. Preferably, each ratcheting serration 70, 72 has a shape similar to a right triangle. The uppermost point of each ratcheting serration 70, 72 has a planar section 71, 73, as shown in FIG. 7. Adjacent ratcheting serrations 70, 72 form grooves for receiving the housing locking tabs 66, 68.

As stated earlier, clamping body nesting section 38 includes the bottom surface 88 on the bottom of the base wall 36. The bottom surface 88 may be provided with frictional enhancement features 90 (FIG. 5), such as teeth, to increase the gripping strength of the connector 10.

A protrusion or plurality of protrusions 40 may extend laterally from one or both of the outer surfaces of the first and second members 28, 30. Each protrusion 40 is preferably integrally molded; however other suitable conventional means maybe used for connection to each member 28, 30. The one or more protrusions 40 preferably slidably engage a respective closed end recess 20 of the housing 12. As best seen in FIG. 3, the protrusion 40 has a circular base portion. Extending from the base portion is a substantially conically shaped projection, which tapers to a central point. The protrusion 40 is preferably made from a substantially resilient material such as plastic, rubber, or a malleable metal.

A cable positioning tab 98 (FIG. 3) extends from the bottom surface 88 to visually assist the installer with insertion of a cable B into the receiving end 44 of the housing 12. The cable positioning tab 98 is orthogonal to the longitudinal axis 96 of the clamping body 26. The cable positioning tab 98 is preferably substantially rectangular; however, it may be of any suitable polygonal shape. The cable positioning tab 98 has a first planar side and a second planar side, one of which engages a terminal end of cable B.

As best seen in FIGS. 1 and 3, the clamping body 12 also has a pair of gripping ears 92 extending from the first end 78 to facilitate handling of the tool for an installer. The gripping ears 92 extend in a direction substantially perpendicular to a longitudinal axis 96 of the clamping body 26. The gripping ears 92 are preferably integrally molded to the clamping body 26; however other suitable conventional means maybe used, such as welding, adhesives, fasteners, molding, casting, or extrusion. The gripping ears 92 are substantially rectangular in shape, and have top and bottom planar surfaces. Edges of the gripping ears 92 may be beveled.

Strengthening ribs 94 are formed between a respective gripping ear 92 and the outer surface 86 of side members 30, 32 to enhance the rigidity of the device and provide increased structural support. The strengthening ribs 94 are placed in between the gripping ear 92 and the first and/or second members 30, 32 at a predetermined angle.

The clamping body 26 may be manufactured by any suitable conventional means such as casting, swaging, molding, forging, or extrusion. Preferably, the clamping body 26 is made of aluminum; however, any suitable metal or plastic material can be used.

Assembly and Operation

Preferably, the connector 10 is preassembled prior to packaging. Assembly is accomplished by first inserting the clamping body 26 into the receiving end 44 of the housing 12. At least one of side walls 14 or 16 deflects, and the protrusion 40 of the clamping body 26 is compressed inwardly. Upon insertion of the clamping body 26 beyond the side walls 14, 16 and adjacent closed end recess 20, the protrusion 40 moves into, and is slidably positioned within the closed end recess 20. It should be understood, that alternatively, closed end recesses 20 and protrusions 40 may be placed on each side wall 14, 16 and on both the first and second members 30, 32, respectively, or can be reversed.

Figure 6:
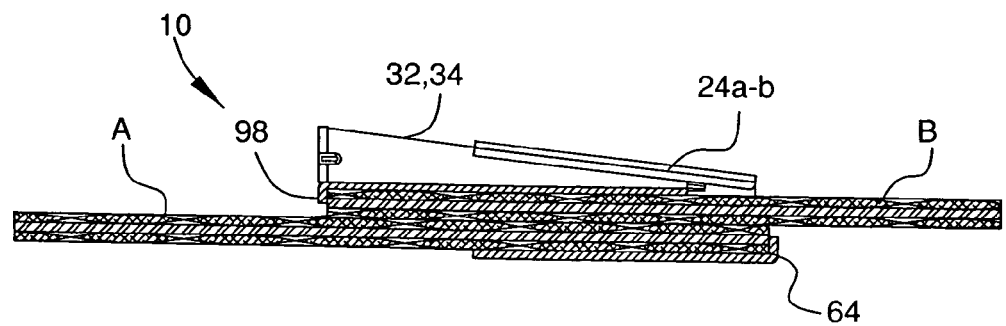
FIG. 6 is a side elevational view in section of the connector of FIG. 1, showing the assembled connector in the clamped position.

Following assembly, the electrical connector 10 is ready to receive the first and second cables A, B. The clamping body 26 may be retracted or advanced slightly to facilitate insertion. As best seen in FIG. 6, first cable A is inserted from the receiving end 44 of the housing 12 until it reaches the cable locating tab 64. A second cable B is then inserted from the narrow end 46 of the housing 12 until the cable positioning tab 98 is reached. In this manner, the installer may visually determine if both cables A, B are fully inserted into the assembled connector 10.

Once the cables A, B are fully inserted, the clamping body 26 is urged forward. The clamping body 26 slides parallel to the longitudinal axes 54, 96 and along angled guide channels 24a–b. The clamping body 26 upper bearing surfaces 32, 34 may also be angled such that, when the clamping body 26 is urged forward along the guide channels 24a–b, the distance between surfaces 60, 88 or the height of the cable passageway 42 decreases. Thus, a clamping or gripping action is achieved. The clamping or gripping action is enhanced by frictional enhancement features 62, 90 formed on the respective surfaces 60, 88 of the housing 12 and clamping body 26.

Turning to FIG. 7, as the clamping body 26 is urged forward, ratcheting serrations 70, 72 of each upper bearing surface 32, 34 ratchetably engage with locking tabs 66, 68. Thus, the clamping body 26 can be incrementally urged forward; while, reversal of the clamping body 26 may be prevented. Additional tension applied to the cables A, B urges the clamping body 26 forward, thus increasing the clamping pressure accordingly.

In one embodiment, cables A, B are electrical cables having an oxide layer. Additionally, as the two cables A, B are clamped towards one another, an oxide layer on the surface of each cable A, B is abraded. Thus, cables A, B are forced into intimate electrical contact with one another due to the compressive force of the clamping body 26. Thus, the connector 10 provides an excellent, high integrity electrical interface.

While a particular embodiment has been chosen to illustrate the invention, it would be understood by those skilled in the art that various changes and modifications can be made therein without departing from the scope of the invention as defined in the appended claims.

What is claimed is:

1. A connector, comprising:
    a housing having a receiving end, a narrow end, first and second side walls, and a housing cable nesting section;
    a closed end recess longitudinally disposed on said first side wall;
    first and second guide flanges connected to top edges of said first and second side walls, respectively;
    a clamping body slidably engaged with said housing, said clamping body including first and second side members having upper bearing surfaces, a base section, connecting said side members and a clamping body cable nesting section;
    at least one protrusion extending laterally from said first member, and longitudinally slidably engaged within said closed end recess, said protrusion having a smaller longitudinal length than that of said closed end recess; and a cable receiving passageway positioned between said cable nesting sections, said upper bearing surfaces of said clamping body slidably engaging said guide flanges of said housing.

2. A connector according to claim 1, wherein an engagement surface of said housing cable nesting section faces an engagement surface of said clamping body cable nesting section.

3. A connector according to claim 2, wherein said housing cable nesting section engagement surface has teeth, and a cable locating tab disposed proximate the narrow end.

4. A connector according to claim 2, wherein said clamping body nesting section has teeth.

5. A connector according to claim 1, wherein said clamping body has first and second ends, said upper bearing surfaces of said side members tapering from said first end to said second end at an angle about between 6–7 degrees to a longitudinal axis of the clamping body.

6. A connector according to claim 1, wherein locking tabs extend along said guide flanges proximate said narrow end of said housing.

7. A connector according to claim 6, wherein each upper bearing surface has serrations proximate a second end of said clamping body, to releasably engage said locking tabs.

8. A connector according to claim 1, wherein said clamping body has first and second ends; and a cable positioning indicator tab is attached to said first end.

9. A connector according to claim 1, wherein said receiving end of said housing has at least one gripping ear extending therefrom.

10. A connector according to claim 1, wherein a first end of said clamping body has at least one gripping ear extending therefrom.

11. A connector according to claim 1, wherein said guide flanges have a downwardly facing end extending substantially parallel to said first and second side walls of said housing.

12. A connector according to claim 1, wherein said housing has a substantially U-shaped cross section.

13. A connector according to claim 1, wherein said clamping body has a substantially U-shaped cross section.

14. A connector assembly, comprising:
a housing having a receiving end, a narrow end, first and second side walls, and a housing cable nesting section;
a closed end recess longitudinally disposed on said second side wall;
first and second guide flanges connected to top edges of said first and second side walls, respectively, locking tabs extending longitudinally from said guide flanges proximate said narrow end of said housing;
a clamping body slidably engaged with said housing, said clamping body including first and second side members having upper bearing surfaces, a base section connecting said side members and a clamping body cable nesting section, said bearing surfaces being engaged by said locking tabs;
an engagement surface of said housing cable nesting section opposes an engagement surface of said clamping body cable nesting section;
at least one protrusion extending laterally from said second member, and slidably engaged within said closed end recess; and
a cable receiving passageway positioned between said cable nesting sections, said upper bearing surfaces of said clamping body slidably engaging said guide flanges of said housing for movement.

15. A connector according to claim 14, wherein said housing cable nesting section engagement surface has teeth, and a cable locating tab disposed proximate the narrow end.

16. A connector according to claim 14, wherein said clamping body nesting section has teeth.

17. A connector according to claim 14, wherein said clamping body has first and second ends, a top surface of said side members taper from said first end to said second end at an angle about between 6–7 degrees to a longitudinal axis of the clamping body.

18. A connector according to claim 17, wherein each upper bearing surface has at least one ratcheting serration proximate a second end of said clamping body, releasably engaged with said locking tabs.

19. A connector according to claim 14 wherein said clamping body has first and second ends;
a cable positioning indicator tab is attached to said first end.

20. A method of using a connector, comprising:
slidably engaging at least one protrusion of a clamping body within a closed end recess longitudinally disposed on one of a first or second side wall of a housing,
inserting a first cable into a receiving end of the housing proximate a housing cable nesting section,
inserting a second cable into a narrow end of the housing proximate a clamping body cable nesting section, so that both cables are positioned in a cable receiving passageway disposed between the cable nesting sections, respectively, and
advancing the clamping body toward the housing narrow end, and an engagement surface of the clamping body cable nesting section cams towards an opposed engagement surface of the housing cable nesting section, as the protrusion slides longitudinally in the closed end recess, thus reducing a height of the cable receiving passageway, and clamping the cables therebetween so that additionally tension applied to the conductor urges the clamping body forward and increases clamping pressure.

* * * * *